(No Model.)

J. P. CULVER.
WATER, GAS OR DRAIN PIPE.

No. 271,687. Patented Feb. 6, 1883.

Witnesses,
Geo. H. Strong
S. H. Rouse

Inventor
John P. Culver
Dewey & Co.
Attorneys

UNITED STATES PATENT OFFICE.

JOHN P. CULVER, OF TUCSON, ARIZONA TERRITORY.

WATER, GAS, OR DRAIN PIPE.

SPECIFICATION forming part of Letters Patent No. 271,687, dated February 6, 1883.

Application filed August 3, 1882. (No model.)

*To all whom it may concern:*

Be it known that I, JOHN P. CULVER, of the city of Tucson, county of Pima, Territory of Arizona, have invented an Improved Asphalted and Iron Tube or Pipe; and I hereby declare the following to be a clear, exact, and full description thereof.

My invention relates to that class of pipes which are composed of thin iron sheets or other suitable metals, having a layer of asphaltum interposed between the layers of iron, so that when properly formed the asphaltum will fully preserve the iron.

Figure 1:
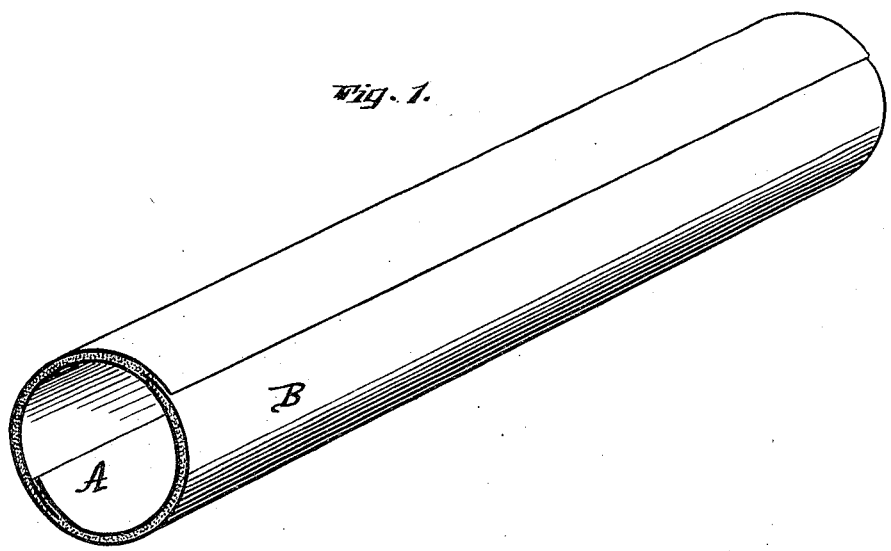
Figure 2:
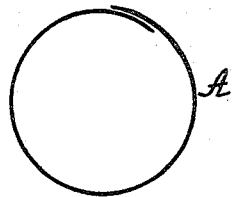
Figure 3:
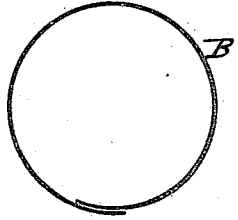
Figure 4:
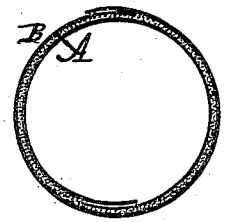

In the accompanying drawings, Figure 1 is a view of my improved pipe. Figs. 2 and 3 are end elevations of the inner and outer metal sheets; Fig. 4, an end elevation of the finished pipe.

A A B B are two or more shells of sheet metal, suitably formed into tubes by first preparing the edges of the sheets, so as to solder them together by lapping the edges, applying heat, and soldering them, thus forming a tube. After two of these tubes have been thus made, one being a shade smaller than the other, they are both dipped in hot liquid asphaltum, and while the asphaltum is in a molten condition one tube is telescoped into the other, thus forming a strong, light, and durable tube, and by suitably joining these tubes I am enabled to form a continuous line of pipes for the conveyance of water or other fluids.

I am aware that sheet-metal tubes have been made and lined with hydraulic cement; but in these there must be a sufficient space between the tubes to allow the cement to be tamped in after the pipes are put together. They cannot be telescoped with the cement between them. Where transportation is high and a light pipe a necessity the great weight of such pipes prevents their use. Cement is also a brittle lining for pipes, and has never fully protected shells of iron from rust by reason of its being impossible to fully cover every part of the iron in lining, whereas by immersing in hot liquid asphaltum all these difficulties are overcome.

Having thus described my invention, what I claim as new, and desire to secure by Letters Patent, is—

1. The improvement in water-pipes, consisting of two shells of sheet metal rolled into tubular form, and having their edges lapped and soldered, one pipe being telescoped within the other beneath a body of hot liquid asphaltum, by which a bond or union is effected and the metal protected, substantially as herein described.

2. A water-pipe formed of two or more tubes of thin sheet-iron of different diameters, telescoped one within the other while dipped in hot liquid asphaltum, substantially as herein described.

In witness whereof I hereunto set my hand.

JOHN P. CULVER.

Witnesses:
  W. H. CULVER,
  E. W. ARAM.